Figure 1:
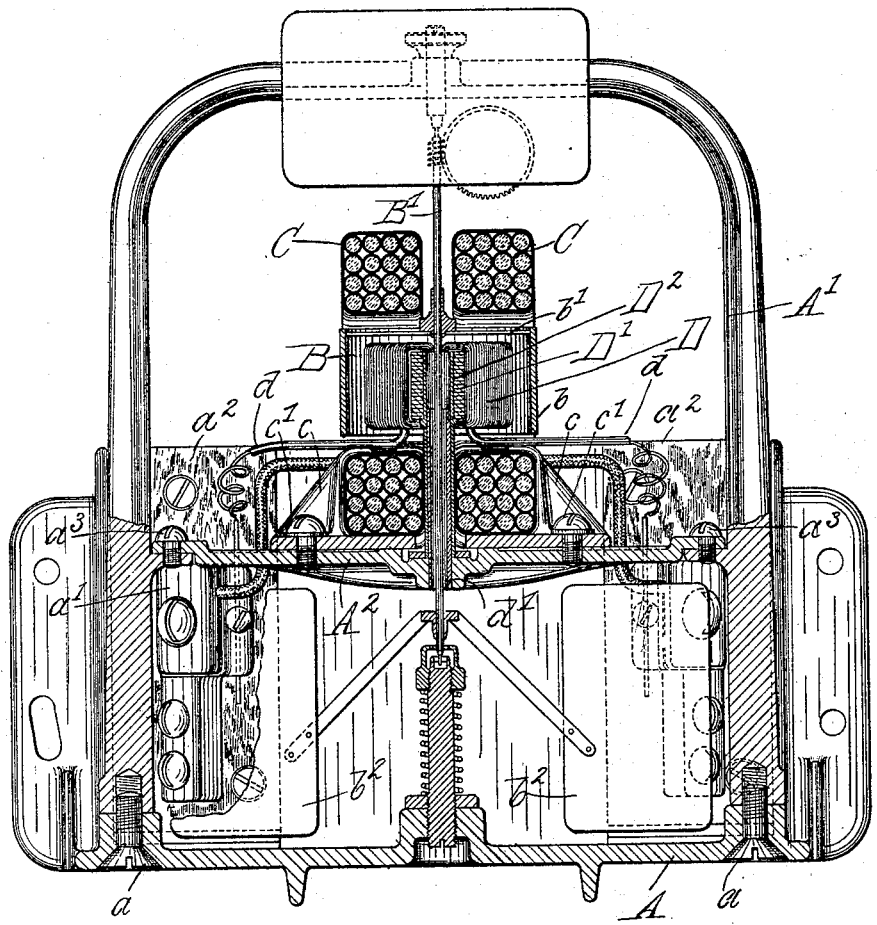

(No Model.)

T. DUNCAN.
ELECTRIC METER.

No. 604,460. Patented May 24, 1898.

Witnesses
S. R. Bachtel
C. M. Chambers.

Inventor
Thomas Duncan
By his Attorneys
Carter & Graves (No Model.) 5 Sheets—Sheet 3.

T. DUNCAN.
ELECTRIC METER.

No. 604,460. Patented May 24, 1898.

Witnesses
S. R. Bachtel
C. M. Chambers

Inventor
Thomas Duncan
By his Attorneys
Carter & Graves (No Model.) 5 Sheets—Sheet 4.

T. DUNCAN.
ELECTRIC METER.

No. 604,460. Patented May 24, 1898.

Witnesses
S. R. Bachtel
C. M. Chambers.

Inventor
Thomas Duncan
By his Attorneys
Carter & Graves (No Model.) T. DUNCAN. 5 Sheets—Sheet 5.
ELECTRIC METER.
No. 604,460. Patented May 24, 1898.

Witnesses
J. R. Bachtel.
C. M. Chambers.

Inventor
Thomas Duncan
By his Attorneys
Carter & Graves

UNITED STATES PATENT OFFICE.

THOMAS DUNCAN, OF FORT WAYNE, INDIANA.

ELECTRIC METER.

SPECIFICATION forming part of Letters Patent No. 604,460, dated May 24, 1898.

Application filed August 6, 1897. Serial No. 647,303. (No model.)

*To all whom it may concern:*

Be it known that I, THOMAS DUNCAN, a resident of Fort Wayne, Allen county, Indiana, have invented certain new and useful Improvements in Electric Meters, of which the following is a specification.

This invention relates to alternating-current meters of that class in which a rotary armature is set in motion by the inductive action of two or more magnetic fields of differing phase, and it relates more particularly to that type of such meters in which the rotary armature is of annular or cylindric form and the magnetic fields are set up by inductive agencies, of which part are placed inside of and part exterior to the armature.

The object of this invention is to improve the efficiency and practicability of meters of this class by increasing the torque due to any given current without increasing the energy consumed by the meter, and thus to render the action of the instrument more sensitive and accurate, especially under light loads, where friction and inertia ordinarily offer a serious disturbing influence. Such effective increase of torque, I have discovered, will result from an arrangement of the internal and external fields such as to increase the number of centers or axes of polarization due to said fields. For example, in a familiar form of meter having an annular armature, an external series field, and an internal field arranged with its axis at an angle to the axis of the series field (this arrangement being present in several of the meters now on the market) I have found that by providing an additional field arranged on an axis distinct from the axes of the other fields and so located that the axis of one field extends between two of the fields that are set up on the opposite side of the annular wall of the meter from the first field the torque may be nearly or quite doubled without any appreciable increase in the amount of energy consumed by the instrument and without in any way altering the drag. In one effective construction embodying this improvement the exterior or series coils are provided as formerly, while the coils of the interior field are mounted upon the poles of a cross-shaped core arranged with its axes intersecting the axis of the series coil. In the forms shown in this instance the coils on the several poles of said core are all positively energized by connections with the work-circuit, and the windings are such as to set up unlike poles on opposite sides of the axis of the series coils at its two points of intersection with the annular wall of the armature. The necessary difference in phase between the fields conveniently results in the construction shown from making the core of laminated iron, so that the resulting self-inductance causes the current in the inner coils to lag behind the current in the series coils. Rotation therefore results, as in previous types of meter, but the torque is, as before stated, largely increased. My improvement therefore enables me to obtain an equal or greater torque with a material decrease in the amount of copper employed in the coils or to largely increase the torque and drag with the same amount of copper. In either case the efficiency and accuracy of the meter will be greatly improved without adding materially to the cost of manufacture or maintenance.

The invention will be more fully understood from the following description of the appended drawings, illustrative thereof, in which—

Figure 2:
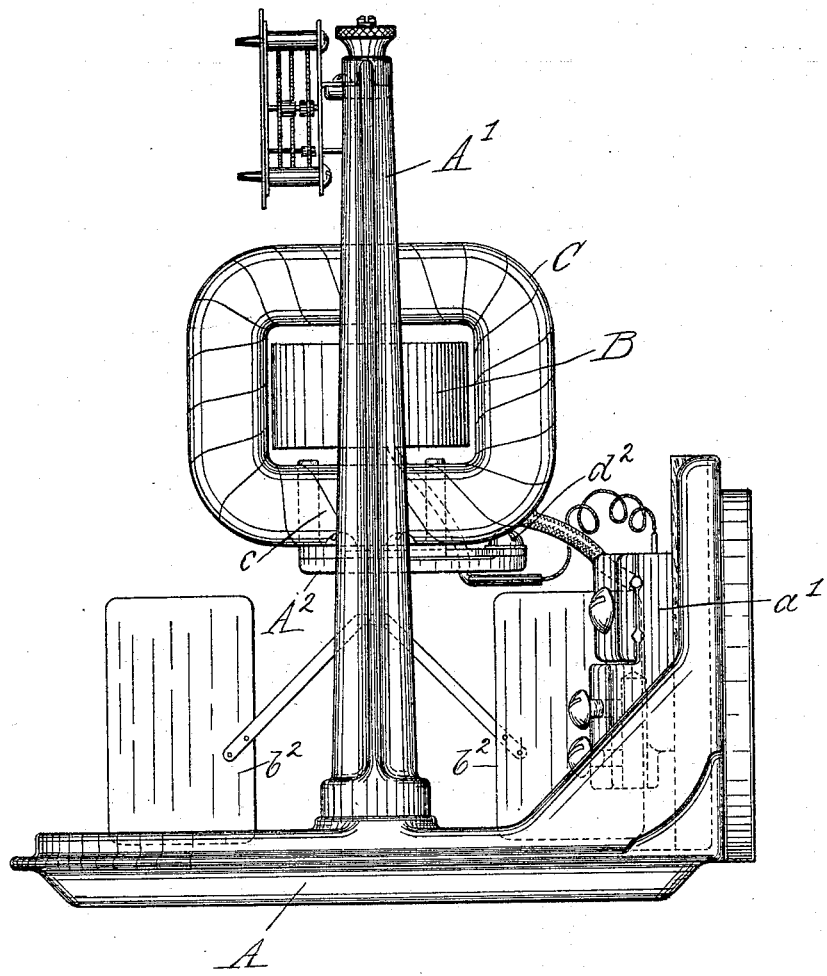
Figure 3:
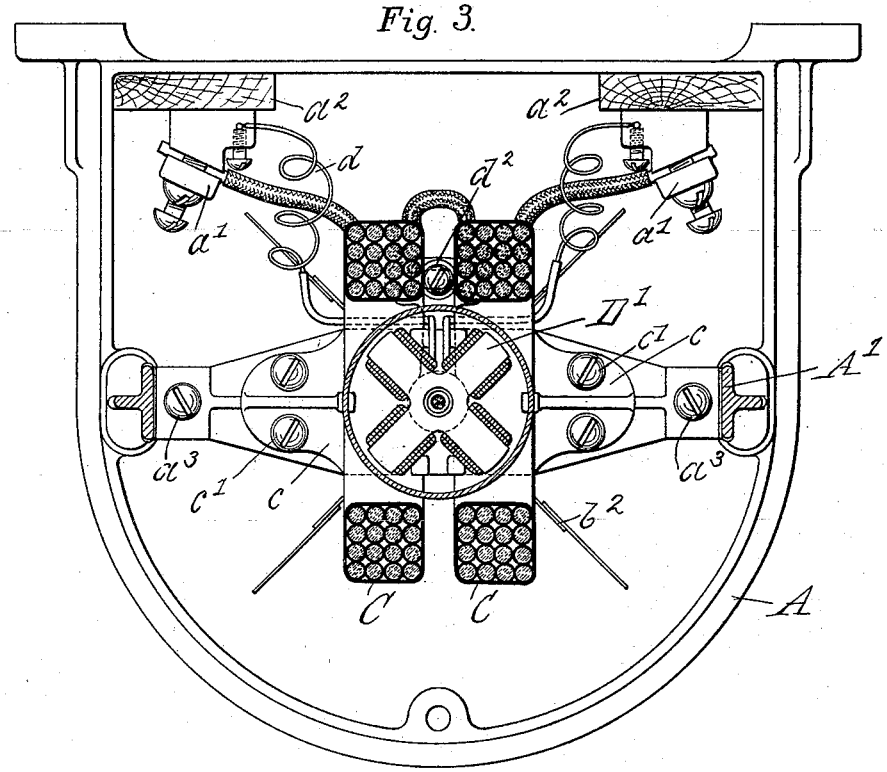
Figure 4:
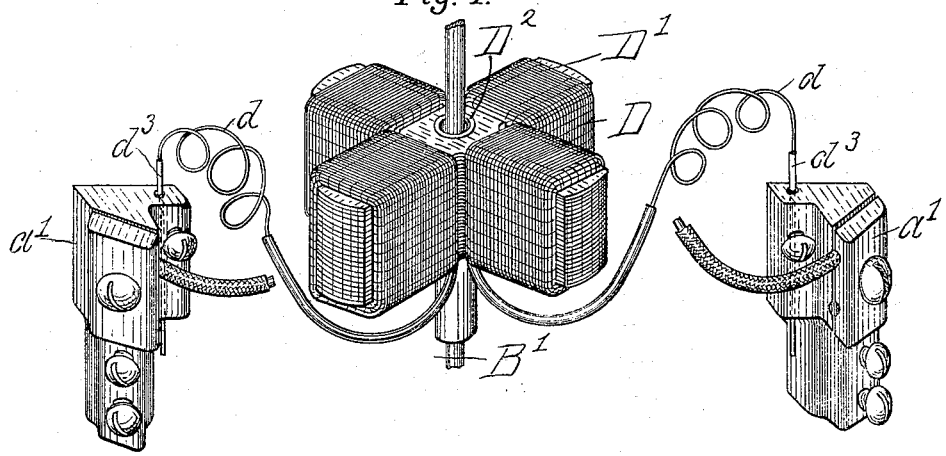
Figure 5:
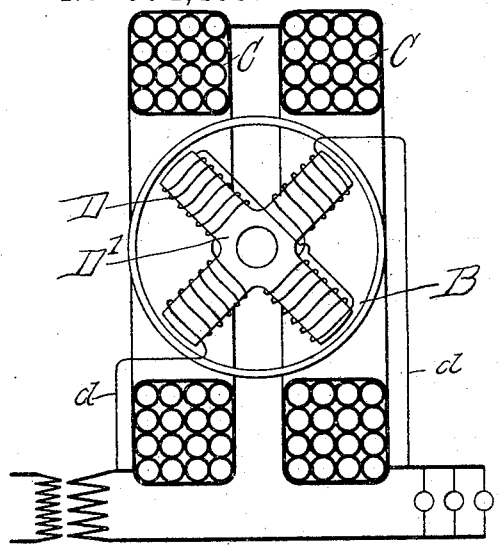
Figure 6:
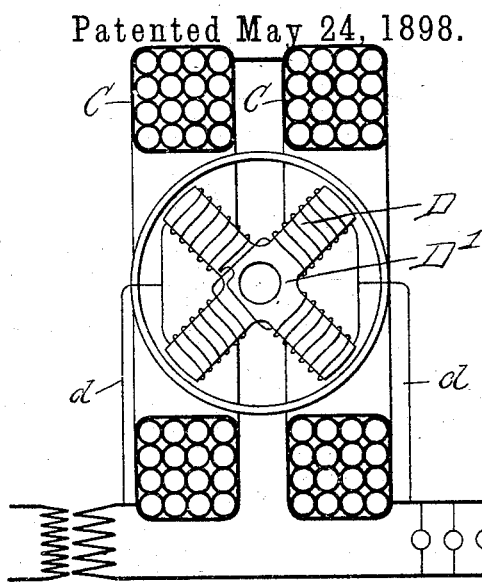
Figure 7:
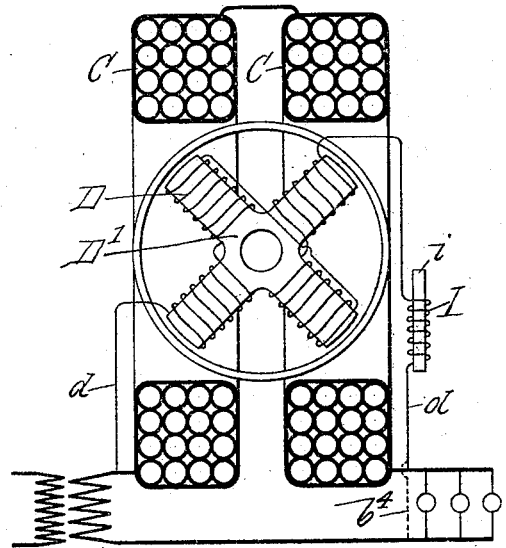
Figure 8:
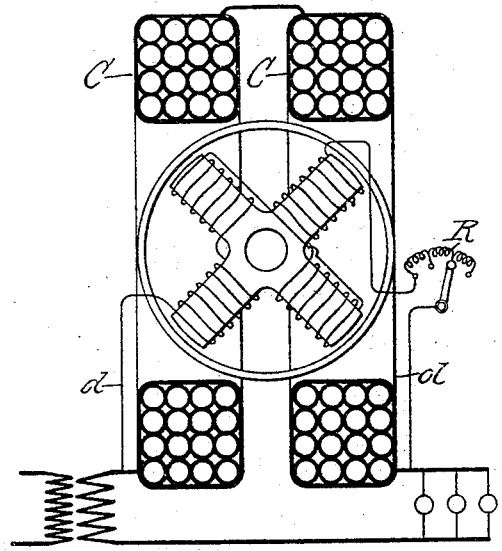
Figure 9:
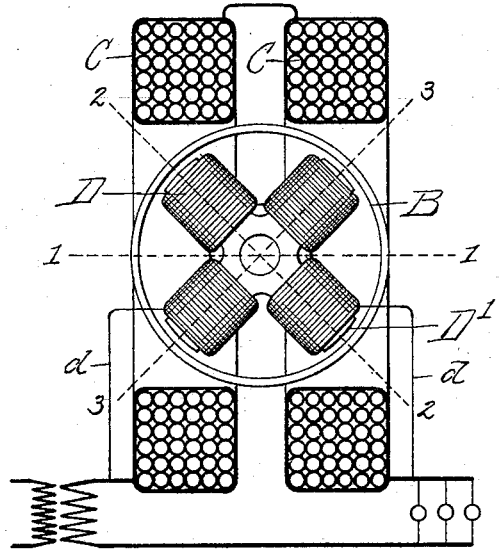
Figure 10:
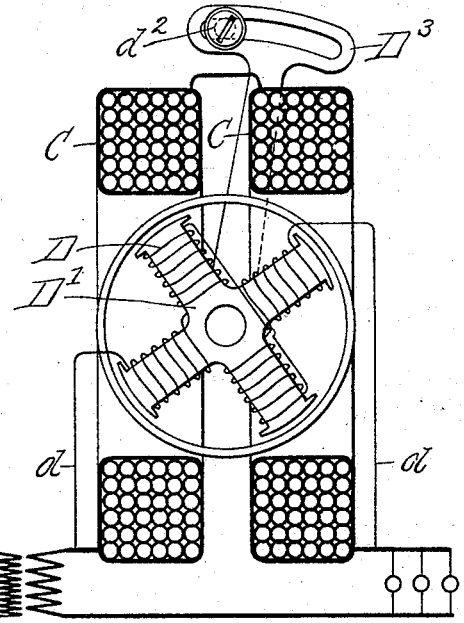
Figure 11:
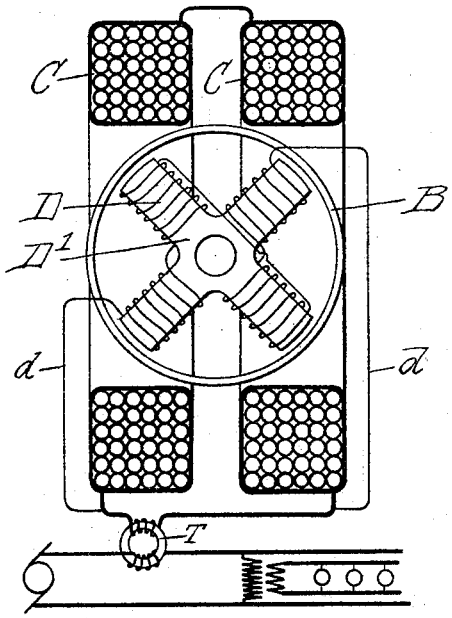
Figure 12:
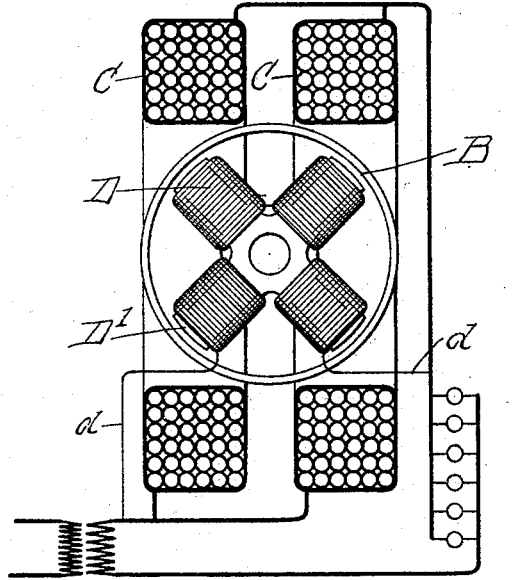

Figure 1 is a front sectional elevation of a coulomb or ampere hour meter constructed in accordance with my invention. Fig. 2 is a side elevation thereof. Fig. 3 is a top plan section of the meter. Fig. 4 is a perspective detail of the inner fields and connections. Fig. 5 is a diagrammatic view showing the inner coils connected in series with each other. Fig. 6 is a similar view, but showing the inner coils connected in parallel. Figs. 7 and 8 show different adjusting devices. Fig. 9 is a diagrammatic view showing the several axes of polarization. Fig. 10 is a similar view showing a further means of adjustment and a form of core-punching designed to retain the inner coils in place on the core. Fig. 11 shows a meter connection suitable for high-tension currents. Fig. 12 shows the series coils arranged in parallel with each other.

In said drawings, A designates the main frame of the meter, and A' an upward-extending transverse yoke which supports the registering-train and the upper spindle-bearing.

For convenience of construction and repair the yoke A' is detachably secured to the base A by screws $a$.

B designates the annular armature, which, as herein shown, comprises a cylindric wall or rim $b$ and a top wall $b'$, through the center of which the supporting-spindle B' passes and to which it is rigidly secured. The spindle B' is mounted to rotate freely in the usual manner, and in the coulomb-meter shown is provided with attached fan-blades $b^2$, that operate, as usual, to afford a drag which varies as the square of the speed.

C C designate the series coils, which are made of heavy wire and are designed to be connected in series in the work-circuit by means of binding-posts $a'$, that are in this instance provided on insulating-blocks $a^2$ at the back of the meter-frame. Said coils C are placed close together on opposite sides of the spindle B' and are enough larger than the armature to allow the latter to rotate freely within them. They are herein shown as supported upon a cross-bar $A^2$, to which they are fastened by clamps $c$ and screws $c'$. The bar $A^2$ rests upon the yoke A' just above the fan-blade $b^2$ and is detachably secured in place by screws $a^3$.

Within the armature B are several coils D, made of comparatively fine wire and herein shown as having their terminals $d$ also connected with the binding-posts $a'$, which obviously arranges said coils in multiple or parallel with the coils C. Said coils D are shown as supported upon the four poles of a cross-shaped core D', which in this instance is made of laminated iron and causes said coils to have a high self-inductance. In the approved form shown the axes of the cross-shaped core are at right angles to each other and are arranged at angles of approximately forty-five degrees with the axis of the coil C. For purposes of adjustment and calibration, however, it is frequently desirable to vary these angles, and to this end the core is desirably made adjustable about a vertical axis. In the construction shown the several laminæ of the core are secured upon the upper end of a tubular standard $D^2$, which passes down between the series coils and rests upon the cross-bar $A^2$. Said standard fits over and is capable of oscillation about a fixed centering-tube $d'$, which is inserted in the aperture in the cross-bar through which the spindle B' passes and loosely surrounds said spindle. A lever $D^3$ is attached to the lower end of the standard $D^2$ and is provided at its outer end with an arc-shaped slot through which a clamping-screw $d^2$ is passed. By adjusting this lever in various positions within the limits of said slot the position of the inner core and field may be varied with reference to the axis of the series field to produce the speed adjustment desired. A further means of adjustment is in this instance conveniently provided by securing terminals $d^3$, of German-silver wire or the like, to the ends $d$ of the coils D and inserting them a greater or less distance in the binding-posts $a'$ to alter the resistance of the circuit. This adjustment affords a very convenient and ready method of regulating the action of the meter within certain limits and in itself is obviously adapted for use on other instruments than the kind to which this invention more particularly relates. Still other means of adjustment may also be employed either in connection with or as substitutes for the adjustments thus described. For example, in Fig. 7 a separate inductance-coil I, having an adjustable core $i$, is inserted in the inner circuit, while in Fig. 8 an adjustable non-inductive resistance R is similarly used. Fig. 7 also shows, by the dotted line at $b^4$, how the inner coils may be connected in shunt across the line to form a wattmeter.

The construction thus described will obviously produce three fields of force tending to polarize the armature and set up Foucault or eddy currents, which will react to produce rotation, the winding of the inner coil being such as to produce unlike poles on opposite sides of the axis 1 1 of the series coils on each side of the meter or adjacent to the two points of intersection of the axis 1 1 with the annular wall of the armature. The axes 2 2 and 3 3 of the inner coils and cross-shaped core, as shown in Fig. 9, lie substantially at right angles to each other and in the central adjustment of the core will cross the axis 1 1 of the series coils symmetrically at angles of forty-five degrees. The method of connecting the meter in circuit will be well understood by those skilled in the art and may obviously be widely varied to meet the circumstances of each particular case. In Figs. 5, 7, 8, 9, 10, 11, and 12 the inner coils are in series with each other, while in Fig. 6 they are wound in parallel. For high-tension service the meter may be connected in a derived circuit energized from the main work-circuit by transformer T. In Fig. 12 the series coils are wound in parallel with each other, and in Fig. 10 the magnetic core D' is provided with flanges or enlarged heads at the ends of its poles to prevent the coils D from slipping off. This figure also shows more in detail the adjustment provided by the lever $D^3$ and clamping-screw $d^2$.

It will be understood that while the particular construction and angular arrangement of the parts illustrated has been found to produce the best results thus far they are susceptible of various changes and rearrangements without departing from the spirit or losing the advantage of the invention, which is accordingly broadly and specifically hereinafter claimed.

I claim as my invention—

1. An electric meter provided with an annular armature and a plurality of magnetic fields part of which are set up within and part without the armature, two fields being arranged on the same side of the annular wall of the armature on separate axes located on opposite sides of the axis of a field on the other side of said annular wall from said two fields, and means for producing a phase displacement between the inner and outer fields.

2. An electric meter provided with an annular armature, a magnetic field exterior to the armature located on an axis intersecting the armature, a plurality of magnetic fields within the armature, two inner fields being arranged on separate axes on opposite sides of the axis of the outer field, and means for producing a phase displacement between the inner and outer fields.

3. An electric meter provided with an annular armature, a magnetic field exterior to the armature, and magnetic fields within the armature located on intersecting axes, each extending at an angle to the axis of the outer field.

4. An electric meter provided with an annular armature, a magnetic field exterior to the armature, and a plurality of magnetic fields within the armature arranged on axes intersecting each other and the axis of the outer field at the center of the armature, and means for producing a phase displacement between the inner and outer fields.

5. An electric meter provided with an annular armature, series coils exterior to the armature, and a plurality of coils within the armature arranged on separated axes on opposite sides of the axis of the series coils, and means for producing a phase displacement between the currents in the outer and inner coils.

6. An electric meter provided with an annular armature, coils exterior to the armature, and coils within the armature arranged on separated axes on opposite sides of the axis of the series coils, and a magnetic core within the inner coils.

7. An electric meter provided with an annular armature, coils exterior to the armature, coils within the armature, and a cross-shaped magnetic core upon the poles of which the inner coils are mounted.

8. An electric meter provided with an annular armature, coils exterior to the armature, a cross-shaped core within the armature arranged with its axes at an angle to the axis of the outer coils and inner coils mounted on the poles of said cross-shaped core.

9. An electric meter provided with an annular armature, coils exterior to the armature, a cross-shaped magnetic core within the armature, coils within the armature mounted upon the poles of the cross-shaped magnetic core, and means for adjusting said core about the axis of rotation of the armature.

10. An electric meter provided with a rotary armature, coils acting inductively on said armature to rotate the latter, binding-posts for connecting said coils in circuit and means for adjusting the speed of the armature, comprising terminals of high resistance secured to the ends of said coils and adapted to be inserted varying distances within the binding-posts.

In testimony that I claim the foregoing as my invention I affix my signature, in presence of two subscribing witnesses, this 26th day of July, A. D. 1897.

THOMAS DUNCAN.

Witnesses:
EDWARD A. BARNES,
CHARLES C. MILLER.